United States Patent [19]

Oidaira et al.

[11] 4,192,594

[45] Mar. 11, 1980

[54] CAMERA FILM PROCESSOR

[75] Inventors: Toshiaki Oidaira; Katsumi Asanuma; Takekazu Yanagimoto; Senzi Yasui, all of Tokyo; Kozo Saito, Higashikurume; Yoshio Hakamata, Tokyo, all of Japan

[73] Assignee: Fuji Photo Film Co., Ltd., Kanagawa, Japan

[21] Appl. No.: 953,175

[22] Filed: Oct. 20, 1978

[30] Foreign Application Priority Data

Oct. 21, 1977 [JP] Japan .................................. 126466

[51] Int. Cl.$^2$ .......................................... G03B 17/50
[52] U.S. Cl. ................................... 354/90; 354/83; 354/297; 355/28
[58] Field of Search .................. 354/83, 84, 88-93, 354/211; 355/27-29, 64; 354/297, 319

[56] References Cited

U.S. PATENT DOCUMENTS

| | | | |
|---|---|---|---|
| 1,743,616 | 1/1930 | Nolan | 354/90 |
| 3,557,675 | 1/1971 | Koll et al. | 354/211 X |
| 3,783,763 | 1/1974 | Whitley et al. | 354/211 X |
| 3,987,465 | 10/1976 | Sippel | 355/27 X |

Primary Examiner—John Gonzales

[57] ABSTRACT

A camera portion and a processor portion are combined so that the film exposed in the camera portion is processed in the processor portion. The camera portion is provided with a roll film take-up magazine and a cutter for cutting a roll film into sheet film. When roll processing is desired, the exposed roll film is taken up in the roll film take-up magazine and the magazine is put into the processing portion. When sheet processing is desired, the exposed roll film is cut into sheet film in the camera portion and fed into the processor portion. The processor portion is provided with a first film passage for guiding the sheet film into the processor and a second film passage for guiding the roll film into the processor. The processor portion has a roll film magazine holding device for holding the roll film take-up magazine so that the roll film taken out thereof is guided into the processor through the second film passage.

3 Claims, 2 Drawing Figures

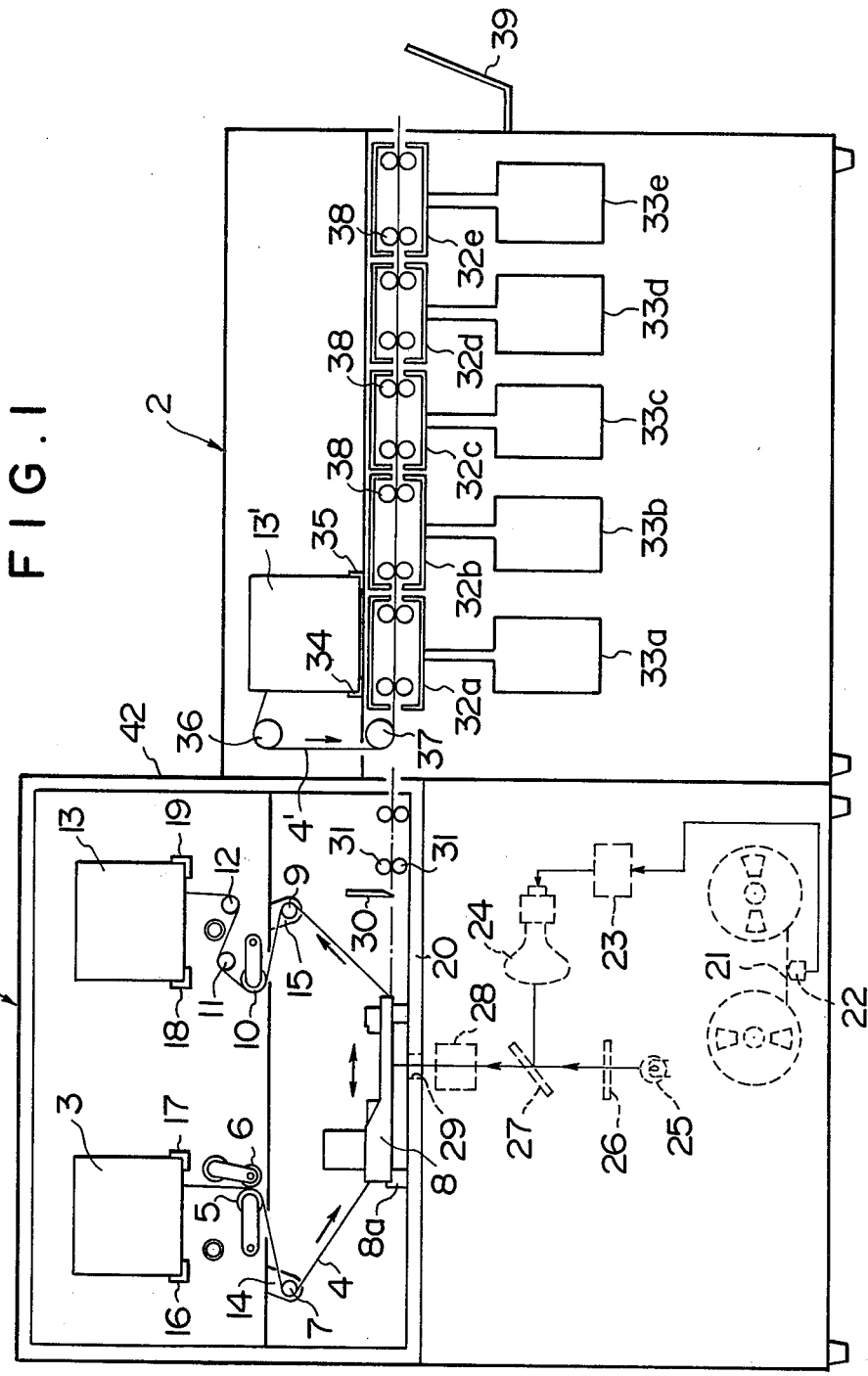

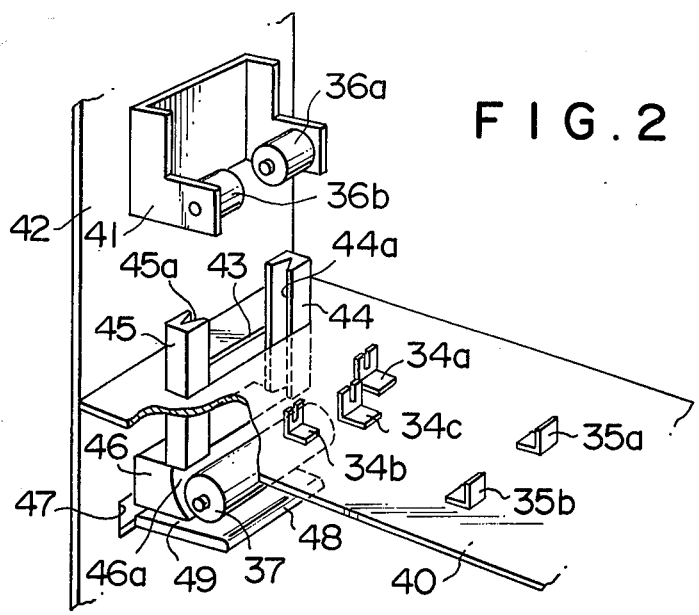
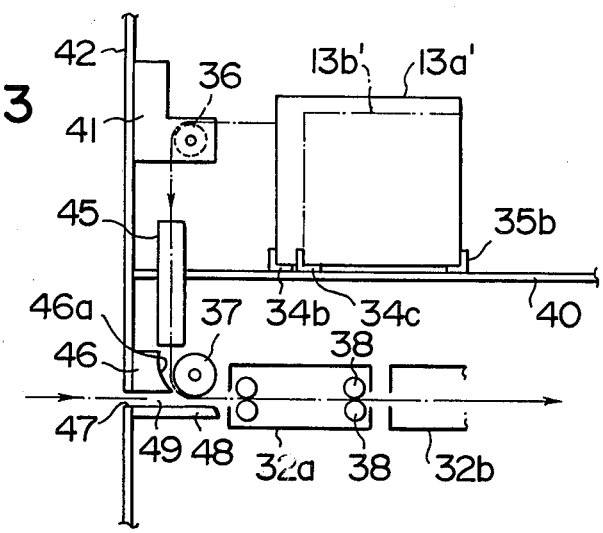
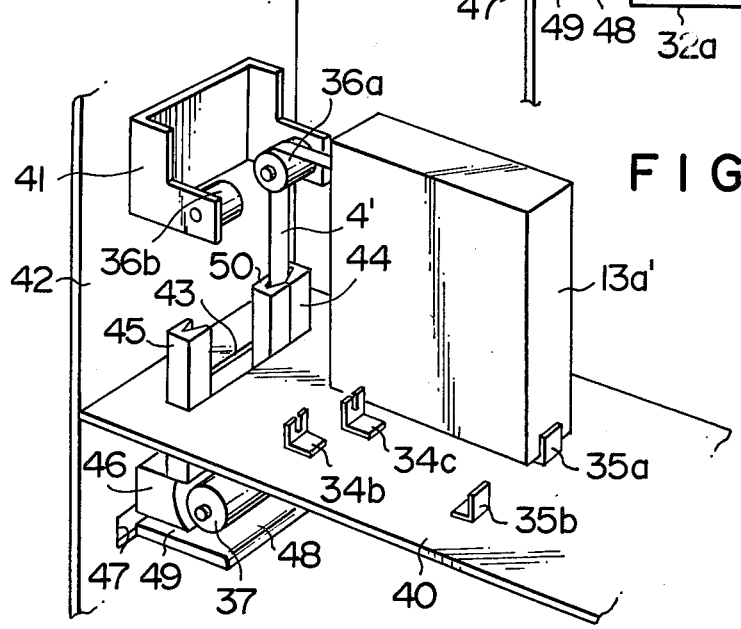

4,192,594

CAMERA FILM PROCESSOR

BACKGROUND OF THE INVENTION

1. Field of the Invention

This invention relates to a camera with film processor comprising a photographic camera and a processor for developing a film exposed by the camera, and more particularly to a camera film processor capable of developing an exposed roll film either when the film is in roll form or when the film is in sheet form. In other words, the present invention relates to a camera film processor capable of both roll processing and sheet processing.

2. Description of the Prior Art

It has been known in the art to display an output of a computer on a cathode ray tube and record the displayed output on a microfilm. This is conducted by use of a kind of a camera film processor called computer output microfilmer (hereinafter referred to as COM). In COM, a roll film is cut into sheets after exposure and the cut sheets are fed out of the camera and put into a processor.

There are two film processing systems which have been put into practical use. In one the roll film is processed without being cut into sheets and in the other the roll film is processed after being cut into sheets. The former is called roll processing and the latter is called sheet processing. The conventional camera film processors including COM are capable of conducting either one of these systems, but unable to conduct both of these processing systems.

SUMMARY OF THE INVENTION

It is therefore the primary object of the present invention to provide a camera film processor which is capable of selectively conducting roll processing or sheet processing.

The camera film processor in accordance with the present invention is characterized in that the camera film processor is composed of a camera portion and a processor portion both including a film take-up magazine holding means. The film take-up magazine holding means in the camera portion holds a film take-up magazine which takes up a roll film fed out of a film feed-out magazine in the camera. The film take-up magazine holding means in the processor portion holds a film take-up magazine which has been removed from the camera portion and in which the roll film has been taken up. The camera processor in accordance with the present invention is further characterized in that the camera portion is provided with a film cutter which cuts the film which, having passed through a photographing station in the camera portion, is fed out of the film feed-out magazine. The cutter cuts the roll film into sheets. Behind the cutter is provided a pair of sheet film feed-out rollers for feeding the cut film to the processor portion. Further, there is provided a first film passage for guiding the cut sheet film from the camera portion to the processor portion and a second film passage for guiding the roll film from the film take-up magazine held in the processor portion to the processor. The first and second film passages come together at the inlet of the processor to guide the film from whichever passage to the processor.

BRIEF DESCRIPTION OF THE DRAWINGS

FIG. 1 is a vertical sectional view of the camera processor in accordance with an embodiment of the present invention, FIG. 2 is a fragmentary perspective view showing the inlet of the processor in the processor portion of the camera processor in accordance with the present invention as shown in FIG. 1, FIG. 3 is a fragmentary front view showing the inlet of the processor as shown in FIG. 2, and FIG. 4 is a fragmentary perspective view showing the inlet of the processor as shown in FIG. 2 in which a roll film take-up magazine is held in the magazine holding means in the processor portion.

DESCRIPTION OF THE PREFERRED EMBODIMENTS

Now the present invention will be described in detail with reference to preferred embodiments thereof referring to the accompanying drawings.

Referring to FIG. 1, the camera processor in accordance with the present invention is composed of a camera portion 1 and a processor portion 2. The camera processor shown in FIG. 1 is an example of a COM and the camera portion 1 thereof functions to record minute images on a roll film 4 and to take up or cut into sheets the roll film 4. The processor portion 2 thereof functions to develop and fix the exposed roll film or cut sheet film.

In the camera portion 1, an unexposed roll film 4 retained in a film feed-out magazine 3 is fed to a film stage 8 by way of a pair of guide rollers 5 and 6 and a tension roller 7. The film stage 8 holds the roll film 4 by suction through a number of suction openings provided in the lower surface thereof, and moves in a horizontal plane with the roll film 4 held therewith to expose the film 4 to imagewise light coming from under the camera one frame at a time.

The exposure of the film 4 to the imagewise light is conducted one frame of the roll film at a time by moving the roll film 4 in X and Y directions. The exposed film is taken up in a film take-up magazine 13 by way of a tension roller 9 and guide rollers 10, 11 and 12. In order that the film stage 8 may be moved with the roll film 4 held therewith, the tension rollers 7 and 9 are mounted on a swingable arms 14 and 15.

The film feed-out magazine 3 is demountably held on L-shaped holding members 16 and 17, and the film take-up magazine 13 is demountably held on holding members 18 and 19 which are similar to the holding members 16 and 17.

The film stage 8 is placed on a base board 20 having a flat surface and is provided with plastic sliding feet 8a so that the film stage 8 may slide smoothly on the base board 20.

The information recorded on a magnetic tape 21 is read out by a magnetic head 22 and transmitted to a controller 23 to be displayed by a cathode ray tube 24. On the other hand, fixed information such as frame lines for tables and items to be recorded together with the frame lines is recorded on the form slide 26 illuminated by a light source 25 so that the fixed information may be combined with the information from the cathode ray tube 24 by means of a semi-transparent mirror 27. The combined information is focused on the roll film 4 in the film stage 8 through a taking lens 28 and an aperture 29.

When sheet processing is to be conducted, the roll film 4 is cut into sheets after exposure at the film stage 8 by a cutter 30 located behind the film stage 8. The sheet film cut off the roll film 4 is fed to the processor portion 2 by means of a plurality of pairs of feed rollers 31.

The processor portion 2 includes a series of processing solution baths 32a to 32e containing various processing solutions such as a developer, a fixer, rinsing solution, water etc., tanks 33a to 33e respectively connected with the baths 32a to 32e, film magazine holding members 34 and 35 for holding a film take-up magazine 13' removed from the film magazine holding members 18 and 19 in the camera portion 1, a roll film guide roller 36 for guiding the roll film 4' taken out of the film take-up film magazine 13', and a film feed roller 17 located at the inlet of the first processing solution bath 32a. In each bath 32a-32e, two pairs of feed rollers 38 are provided, one pair at the inlet and one pair at the outlet thereof for feeding the film and dipping the film in the processing solutions. The processed film is discharged into a film receptor 39 attached at the end of the processor portion 2.

Referring to FIGS. 2 to 4 showing the details of the inlet of the processor portion 2, two sets of magazine holding members 34a, 35a and 34b, 35b for holding two film take-up magazines containing 16 mm wide roll films and an additional film magazine holding member 34c for holding a film take-up magazine containing a 105 mm wide roll film in cooperation with said film magazine holding members 35a and 35b are provided on a compartment 40 in the processor portion 2. Said roll film guide roller 36 consists of a pair of guide rollers 36a and 36b supported by a roller support member 41 which is fixed to a compartment wall 42 between the camera portion 1 and the processor portion 2. The roll films in the film take-up magazines 13a' of 16 mm wide are taken out of the magazine 13a' in two lines and guided downward by way of the pair of guide rollers 36a and 36b. The roll film of 105 mm width is guided at its both side edges by the pair of guide rollers 36a and 36b.

The compartment 40 is further provided with an opening 43 for passing therethrough the roll film from the film magazine 13'. Guide members 44 and 45 having a V-shaped guide groove 44a and 45a are provided on both ends of the opening 43 as shown in FIG. 2.

The roll film guided by the guide members 44 and 45 is further guided along a curved surface 46a of a guide block 46 located under the opening 43 of the compartment 40 and is guided along the film feed roller 37. The roll film guide rollers 36, the opening 43, the guide members 44 and 45, the guide block 46 and the film feed roller 37 constitute a second film passage for guiding the roll film from the magazine 13'.

In case of feeding the 105 mm wide roll film, the roll film magazine 13b' for the 105 mm wide roll film is held by the magazine holding members 34c, 35a and 35b and the roll film 4' taken out of the film magazine 13b' is guided by the guide rollers 36a and 36b, the guide members 44 and 45, the guide block 46 and the film feed roller 37. In case of feeding the 16 mm wide roll film, the roll film magazines 13a' containing the 16 mm wide roll film are held by the magazine holding members 34a, 35a, 34b and 35b and the roll films 4' taken out of the film magazines 13a' are guided by said second film passage in which the two roll films are guided along by said two guide rollers 36a and 36b respectively. In this case, since the width of the opening 43 is too large for the 16 mm wide films, separate guide members 50 are inserted into the opening 43 as shown in FIG. 4 in which only one guide member is illustrated.

The sheet film cut out of the roll film in the camera portion 1 is fed into the processor portion 2 through a slot 47 provided in the wall 41 between the camera portion 1 and the processor portion 2 as shown in FIGS. 2 to 4. The sheet film fed into the processor portion 2 is guided through a first film passage 49 formed between the bottom face of said guide block 46 and a guide plate 48 provided under the block 46, and then guided by the film feed roller 37.

In operation, when it is desired to process a roll of film in the form of roll film, the roll processing is conducted by taking up the exposed roll film into a roll film take-up film magazine 13 by way of guide rollers 9 to 12. Then, the film take-up film magazine 13 is removed from the camera portion and put on the magazine holding members 34 and 35 in the processor portion 2. The exposed roll film 4' is taken out of the magazine 13' and guided along the second film passage and processed through the processor consisting of the number of processor solution baths 32a-32e and feed rollers 38. The processed roll film is received by the film receptor 39.

When it is desired to process the roll of film in the form of sheet film, the sheet processing is conducted by cutting the roll film by the cutter 30 and feeding the sheet film into the processor portion 2 by the feed rollers 31 and through the first film passage. The cut sheets of film are fed through the processor by way of the film feed roller 37 and finally received by the film receptor 39.

We claim:

1. A camera film processor composed of a camera portion and a processor portion, said camera portion having a camera for recording information on a roll film and said processor portion having a processor for processing the film, said camera portion comprising a roll film feed-out magazine holding means, a photographing station where the roll film is exposed to imagewise light for photographing, a roll film take-up magazine holding means, film feeding means for feeding a roll film from said roll film feed-out magazine holding means to said roll film take-up magazine holding means by way of photographing station, and a cutter for cutting the roll film into sheet film after the film has been exposed to the imagewise light, said processor portion comprising a roll film take-up magazine holding means, and a roll film guiding means for guiding the roll film taken out of the roll film take-up magazine to said processor, a sheet film guiding means being provided between said cutter and said processor for feeding the cut sheet film from the cutter to the processor.

2. A camera processor as claimed in claim 1 wherein said roll film guiding means is vertically provided and said sheet film guiding means is horizontally provided.

3. A camera processor as claimed in claim 2 wherein said film take-up magazine holding means in the processor portion is located above said processor.

* * * * *